US012265680B1

(12) United States Patent
Levatich et al.

(10) Patent No.: US 12,265,680 B1
(45) Date of Patent: Apr. 1, 2025

(54) MAPPED DIRECT TOUCH VIRTUAL TRACKPAD AND INVISIBLE MOUSE

(71) Applicant: META PLATFORMS TECHNOLOGIES, LLC, Menlo Park, CA (US)

(72) Inventors: Samuel Matthew Levatich, Seattle, WA (US); Etienne Pinchon, Pasadena, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/366,578

(22) Filed: Aug. 7, 2023

(51) Int. Cl.
*G06F 3/048* (2013.01)
*G06F 3/01* (2006.01)
*G06F 3/042* (2006.01)

(52) U.S. Cl.
CPC ............ *G06F 3/0426* (2013.01); *G06F 3/011* (2013.01); *G06F 3/017* (2013.01)

(58) Field of Classification Search
CPC ......... G06F 3/0426; G06F 3/011; G06F 3/017
See application file for complete search history.

(56) References Cited

U.S. PATENT DOCUMENTS

| | | | | |
|---|---|---|---|---|
| 9,874,977 | B1 * | 1/2018 | Soyannwo | G06F 3/042 |
| 9,911,235 | B2 | 3/2018 | Seichter et al. | |
| 10,635,895 | B2 | 4/2020 | Andersen et al. | |
| 10,732,725 | B2 | 8/2020 | Chou et al. | |
| 10,956,724 | B1 * | 3/2021 | Terrano | G06V 10/82 |
| 11,132,058 | B1 * | 9/2021 | Gupta | G06T 19/006 |
| 11,181,986 | B2 | 11/2021 | Chen et al. | |
| 2011/0246904 | A1 * | 10/2011 | Pinto | G06F 9/452 |
| | | | | 715/740 |
| 2018/0284889 | A1 * | 10/2018 | Biggs | G06F 3/0489 |

(Continued)

FOREIGN PATENT DOCUMENTS

| | | | | |
|---|---|---|---|---|
| EP | 3599532 B1 | 6/2022 | | |
| EP | 3332314 B1 * | 4/2024 | ............ | A63F 13/212 |
| WO | WO-2022066360 A1 * | 3/2022 | ............. | G06F 3/017 |

OTHER PUBLICATIONS

Matlani et al., Virtual Mouse using Hand Gestures, 2021, IEEE, 6 pages. (Year: 2021).*

(Continued)

*Primary Examiner* — Linh K Pham
(74) *Attorney, Agent, or Firm* — Morgan, Lewis & Bockius LLP

(57) ABSTRACT

A virtual trackpad engine is configured to perform a technique for accessing and manipulating distant virtual objects in an XR environment. The technique includes generating, in an extended reality (XR) environment, a virtual model corresponding to a hand of a user. The technique also includes generating a virtual trackpad in the XR environment, where a surface of the virtual trackpad is mapped to a surface of a distant virtual object in the XR environment. Further, the technique includes determining if the virtual trackpad is activated and responsive to a determination that the virtual trackpad is activated, tracking a movement of the virtual hand. The technique further includes determining an action to be performed in relation to the distant virtual object that corresponds to the movement and, subsequently, performing the action.

18 Claims, 10 Drawing Sheets

(56) References Cited

U.S. PATENT DOCUMENTS

| | | | | |
|---|---|---|---|---|
| 2020/0174653 A1* | 6/2020 | Klein | ............... | G06F 3/04886 |
| 2022/0129147 A1* | 4/2022 | Slassi | ............... | G06F 3/04886 |
| 2022/0147228 A1* | 5/2022 | Yi | ............... | G06F 3/04883 |
| 2023/0139626 A1* | 5/2023 | Berliner | ............... | G06F 1/1694 |
| | | | | 345/156 |
| 2024/0036646 A1* | 2/2024 | Yu | ............... | G06F 3/04815 |
| 2024/0036683 A1* | 2/2024 | Yu | ............... | G06F 3/0487 |
| 2024/0185516 A1* | 6/2024 | Bergen | ............... | G06F 3/013 |

OTHER PUBLICATIONS

Feiner et al., A Touring Machine: Prototyping 3D Mobile Augmented Reality Systems for Exploring the Urban Environment, 1997, IEEE, 8 pages.*

* cited by examiner

MAPPED DIRECT TOUCH VIRTUAL TRACKPAD AND INVISIBLE MOUSE

BACKGROUND

Field of the Various Embodiments

Various embodiments relate generally to extended reality devices, and more specifically, to techniques for interacting with objects located in the extended reality environment perceived through the virtual reality devices.

DESCRIPTION OF THE RELATED ART

Cameras are increasingly integrated into handheld, wearable and other types of consumer electronic devices and can serve various functions. For example, wearable devices such as virtual reality (VR), augmented reality (AR), and/or mixed reality (MR) headsets (i.e., extended reality headsets) commonly include cameras that capture the physical space around a user and can also be used for, among other things, perceiving a user's movements (e.g., hand movements), environmental sensing and depth perception. As cameras are integrated into wearable devices including smart glasses, wearable headsets, etc., it is increasingly common for the devices to presents users with an extended reality (XR) environment including one or more virtual objects that a user can manipulate within the XR environment. The virtual objects can be purely virtual or an extended reality overlay of a real-world object. The XR environment may be a virtual, computer-generated environment, a physical real-world environment, or an environment that includes both virtual, computer-generated elements and physical real-world elements.

In certain generalized systems that provide XR environments, problems exist with interacting with virtual objects located at a distance away from the user. In instances where the virtual objects are representations of or extended reality overlays on real-world objects, the corresponding real-world objects may be located at a distance away from the user in the physical space corresponding to the XR environment. Alternatively, the objects may simply be virtual objects that are located at a distance away from the user in the XR environment. In an XR system that does not use controllers and relies on a user's hand gestures, interacting with objects at a distance in an XR environment is challenging. This is especially true because users are conditioned to interact with real-world objects using direct touch and virtual objects in an XR environment may be placed outside the virtual reach of a user's hands.

Providing techniques to interact with such objects, especially techniques that are efficient and result in minimal user fatigue, is challenging for generalized systems. Certain generalized systems, for example, provide computer-vision based hand rays to assist with interacting with virtual objects that are at a distance. While generating hand rays that assist a user in interacting with objects that are at a distance works, interacting with such objects over a prolonged period of time can be ergonomically inefficient and result in user fatigue. Other generalized systems are forced to integrate controllers into their systems to allow a user access to all portions of the XR environment, which increases the overall cost of the system and makes them more cumbersome and less portable.

As the foregoing illustrates, what is needed in the art is a more effective approach to interacting with virtual objects that are a distance in an XR environment.

SUMMARY

One embodiment of the present invention sets forth a technique for accessing and manipulating distant virtual objects in an XR environment. The technique includes generating a model of a user's virtual hands. The technique further includes generating a virtual trackpad that responds to direct touch from the user's virtual hands, where a surface of the visual trackpad is mapped to the surface of a distant virtual object. The technique further includes detecting whether the virtual trackpad has been virtually accessed by the user's virtual hands, with the trackpad becoming responsive once the virtual hands are either touching the trackpad or within a threshold level of proximity. The technique also includes tracking a movement of the user's hands subsequent to the trackpad becoming responsive and monitoring interactions between the user's virtual hands and the virtual trackpad in order to determine the manner in which the distant virtual object should be manipulated.

Other embodiments of the present disclosure include, without limitation, a computer-readable medium including instructions for performing one or more aspects of the disclosed techniques as well as a computing device for performing one or more aspects of the disclosed techniques.

The disclosed techniques offer a significant advantage in enabling users to interact with virtual objects located at a distance in a more comfortable and ergonomic manner. Unlike computer-vision based hand rays that often require users to assume uncomfortable positions, such as raising their hands, the disclosed techniques rely on thumb or index finger movements to move a cursor and select virtual objects. This feature allows for more precision and accuracy in interacting with virtual objects, regardless of the distance between the user's body and the target. Also, this feature precludes the need to integrate controllers into the XR systems, thereby, reducing overall cost and improving the portability of the systems. Furthermore, the relative movement of the user's thumb or index finger can be mapped to the movement of the cursor, which enhances the ergonomic and precise interaction. Overall, these techniques provide an optimal user experience for interacting with virtual objects within an XR environment.

For these reasons, the disclosed techniques represent a technological advancement compared to prior approaches that use more cumbersome methods, such as generating computer-vision based hand rays, to interact with objects at a distance in a virtual environment.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Overview

As noted above, in generalized systems that provide XR environments, problems exist with interacting with virtual objects located at a distance away from the user. Interacting with objects at a distance in an XR environment is challenging, as users are conditioned to interact with real-world objects using direct touch. Providing techniques to interact with such objects, especially techniques that are efficient and result in minimal user fatigue, is typically challenging for generalized systems.

Figure 1:
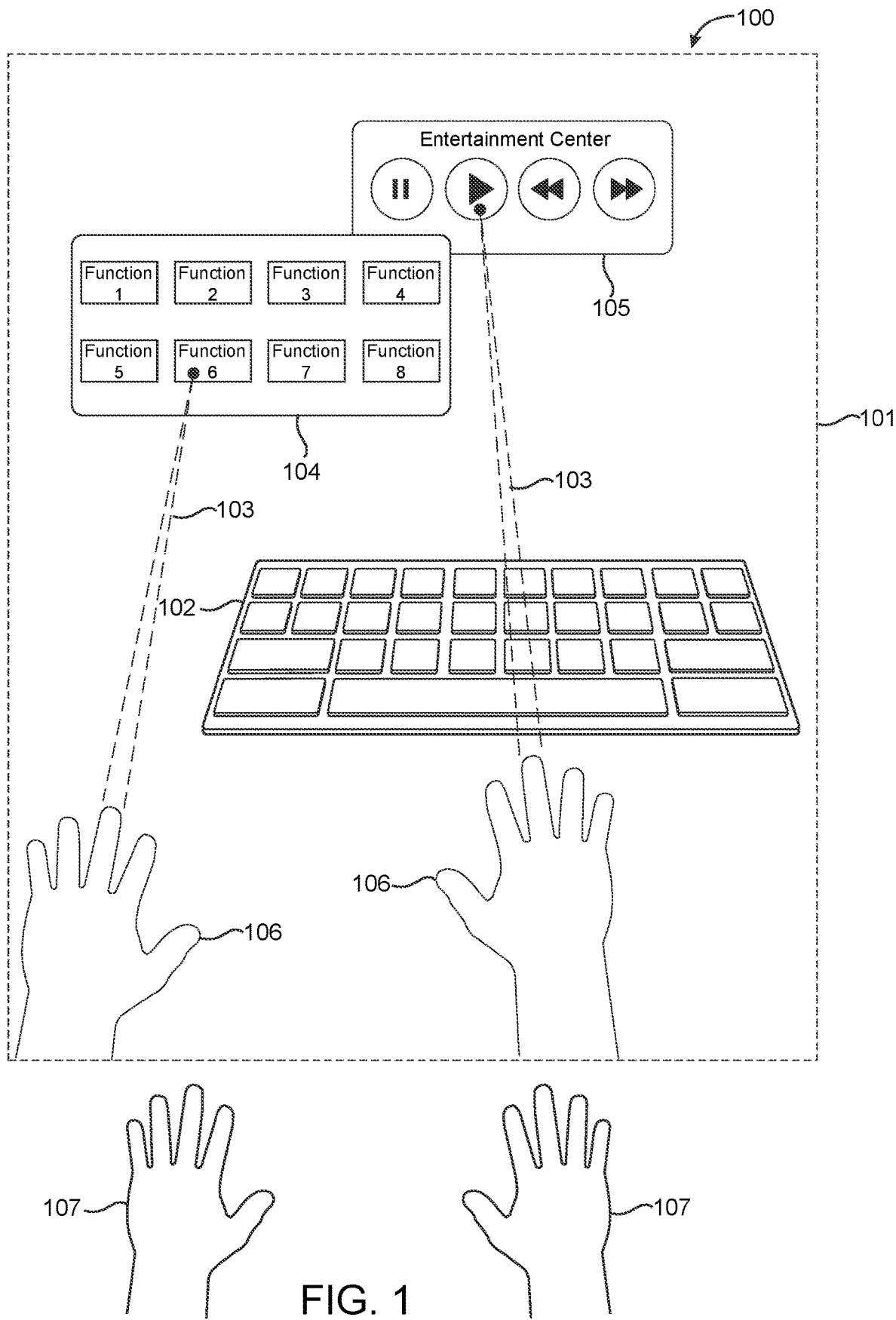
FIG. 1 demonstrates a technique for generating computer-vision based hand rays in a generalized system.

FIG. 1 demonstrates a technique for generating computer-vision based hand rays in a generalized system. As noted above, certain generalized systems provide computer-vision based hand rays to assist with interacting with virtual objects that are at a distance. As shown in FIG. 1, within the XR environment 100, a user's hands 107 (in the physical world) can be virtually represented as a pair of hands 106 within a display 101 in the XR environment 100. The display 101 may be presented to a user via, for example, smart glasses or a wearable headset. While certain virtual objects, such as the virtual keyboard 102 displayed within the XR environment 100, are within reach of the user's virtual hands 106, other virtual objects (e.g., certain graphical user interfaces (GUIs) or windows such as exemplary GUI 104 or entertainment center GUI 105) may be located at a distance and outside the reach of the user's virtual hands 106. Note that a GUI or window may be an exclusively virtual object (e.g., interface 104) or may be a virtual representation of a real-world asset (e.g., entertainment center 105). To address this issue of interacting with distant virtual objects, generalized systems generate computer-vision based hand rays 103 that enable users to access and select various parts of the distant GUIs. While the hand rays allow generalized systems to expand the range of virtual objects that a user can interact with, interacting with such objects over a prolonged period of time can be ergonomically inefficient and result in user fatigue.

To address these issues, various embodiments include a virtual trackpad engine that provides a virtual trackpad in a virtual reality environment. One embodiment sets forth a technique for accessing and manipulating distant virtual objects in an XR environment. The technique includes generating a model of a user's virtual hands. The technique further includes generating a virtual trackpad that responds to direct touch from the user's virtual hands, where a surface of the visual trackpad is mapped to the surface of a distant virtual object. The technique further includes detecting whether the virtual trackpad has been virtually accessed by the user's virtual hands, with the trackpad becoming responsive once the virtual hands are either touching (or in contact with) the trackpad or within a threshold level of proximity. The technique also includes tracking a movement of the user's hands subsequent to the trackpad becoming responsive and monitoring interactions between the user's virtual hands and the virtual trackpad in order to determine the manner in which the distant virtual object should be manipulated.

The disclosed techniques offer a significant advantage in enabling users to interact with virtual objects located at a distance in a more comfortable and ergonomic manner. Unlike computer-vision based hand rays that often require users to assume uncomfortable positions, such as raising their hands, the disclosed techniques rely on thumb or index finger movements to move a cursor and select virtual objects. This feature allows for more precision and accuracy in interacting with virtual objects, regardless of the distance between the user's body and the target. Furthermore, the relative movement of the user's thumb or index finger can be mapped to the movement of the cursor, which enhances the ergonomic and precise interaction. Overall, these techniques provide an optimal user experience for interacting with distant virtual objects within an XR environment.

Accordingly, the disclosed techniques represent a technological advancement compared to prior approaches that use more cumbersome methods, such as generating computer-vision based hand rays, to interact with objects at a distance in a virtual environment.

The Artificial Reality System

Embodiments of the disclosure may include or be implemented in conjunction with an artificial or extended reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, for example, create content in an artificial reality system and/or are otherwise used in (e.g., perform activities in) an artificial reality system. The artificial reality system may be implemented on various platforms, including a wearable head-mounted display (HMD) connected to a host computer system, a standalone HMD, a mobile device or computing system, or any other hardware platform capable of providing artificial reality content to one or more viewers.

It should be noted that although NEDs and head mounted displays (HMDs) are disclosed herein as reference examples, the virtual trackpad disclosed herein can also operate on other types of wearable and non-wearable display elements and display devices that include cameras, for example, camera devices including display elements that can be configured for placement in proximity of an eye or eyes of the user, without being head-mounted (e.g., a dash cam that may be mounted in a vehicle). Further, embodiments of the disclosure are not limited to being implemented in conjunction with artificial or extended reality systems and can also be implemented with other types of image and video capturing systems.

Figure 2:
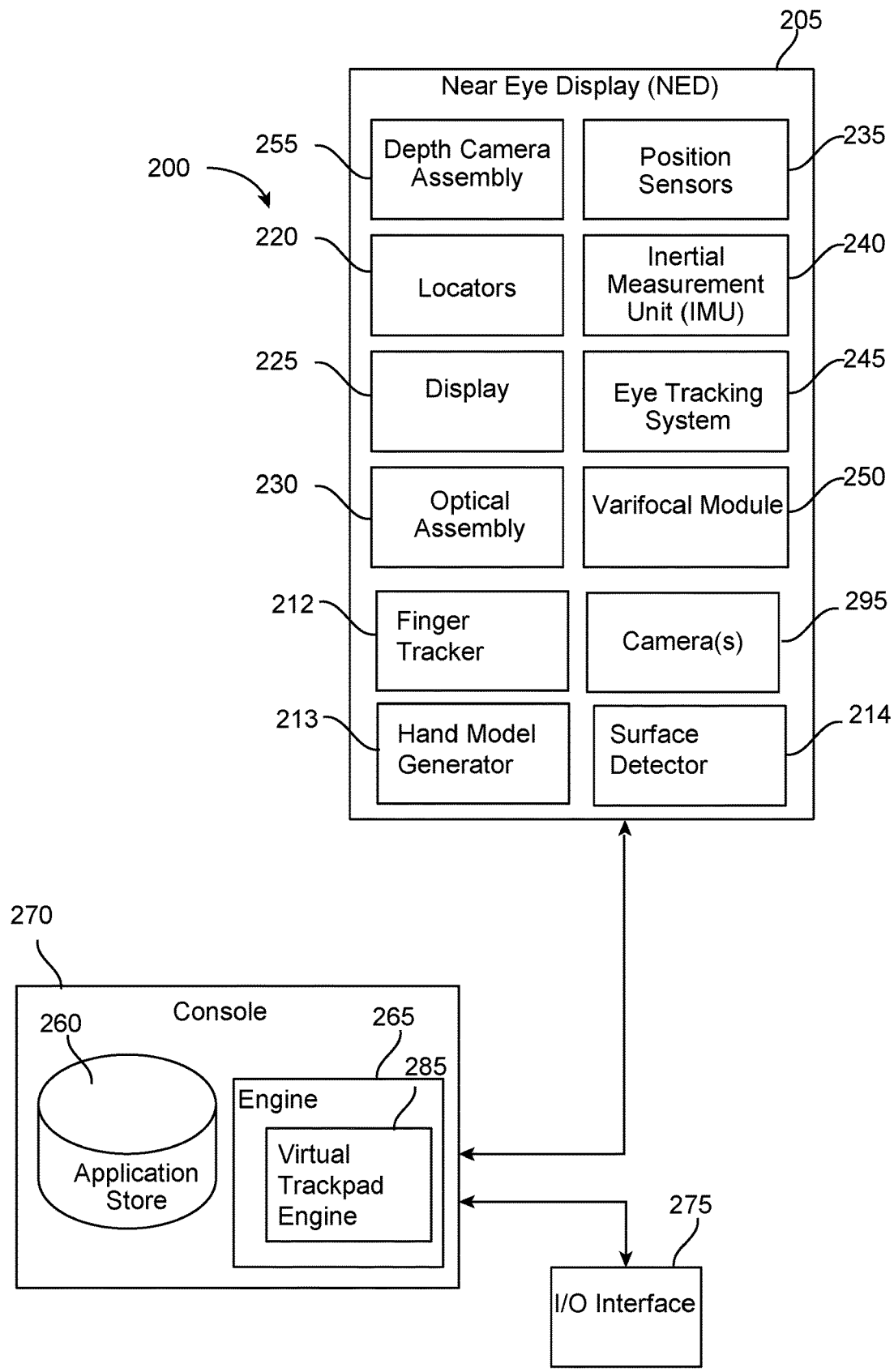
FIG. 2 is a block diagram of an embodiment of a near-eye display (NED) system 200 in which a console operates, according to various embodiments.

FIG. 2 is a block diagram of an embodiment of a near-eye display (NED) system 200 in which a console operates, according to various embodiments. The NED system 200 may operate in an extended reality environment (XR environment), which includes a virtual reality (VR) system environment, an augmented reality (AR) system environment, a mixed reality (MR) system environment, or some combination thereof. The NED system 200 shown in FIG. 2 comprises a NED 205 and an input/output (I/O) interface 275 that is coupled to the console 270. In various embodiments, the composite display system 200 is included in or operates in conjunction with NED 205. For example, the composite display system 200 may be included within NED 205 or may be coupled to the console 270 and/or the NED 205.

While FIG. 2 shows an example NED system 200 including one NED 205 and one I/O interface 275, in other embodiments any number of these components may be included in the NED system 200. For example, there may be multiple NEDs 205, and each NED 205 has an associated I/O interface 275. Each NED 205 and I/O interface 275 communicates with the console 270. In alternative configurations, different and/or additional components may be included in the NED system 200. Additionally, various components included within the NED 205, the console 270, and the I/O interface 275 may be distributed in a different manner than is described in conjunction with FIGS. 2-3B in some embodiments. For example, some or all of the functionality of the console 270 may be provided by the NED 205 and vice versa.

The NED 205 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). As noted above, the computer-generated elements may be presented within the reach of a user's virtual hands or they may be presented at a distance from the user's virtual hands. In some embodiments, the NED 205 may also present audio content to a user. The NED 205 and/or the console 270 may transmit the audio content to an external device via the I/O interface 275. The external device may include various forms of speaker systems and/or headphones. In various embodiments, the audio content is synchronized with visual content being displayed by the NED 205.

The NED 205 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 2, the NED 205 may include a depth camera assembly (DCA) 255, one or more locators 220, a display 225, an optical assembly 230, one or more position sensors 235, an inertial measurement unit (IMU) 240, an eye tracking system 245, a varifocal module 250, a finger tracker module 212, a hand model generator module 213, a surface detector module 214, and one or more cameras 295. In some embodiments, the display 225 and the optical assembly 230 can be integrated together into a projection assembly. Various embodiments of the NED 205 may have additional, fewer, or different components than those listed above. Additionally, the functionality of each component may be partially or completely encompassed by the functionality of one or more other components in various embodiments.

The DCA 255 captures sensor data describing depth information of an area surrounding the NED 205. The sensor data may be generated by one or a combination of depth imaging techniques, such as triangulation, structured light imaging, time-of-flight imaging, stereo imaging, laser scan, and so forth. The DCA 255 can compute various depth properties of the area surrounding the NED 205 using the sensor data. Additionally or alternatively, the DCA 255 may transmit the sensor data to the console 270 for processing. Further, in various embodiments, the DCA 255 captures or samples sensor data at different times. For example, the DCA 255 could sample sensor data at different times within a time window to obtain sensor data along a time dimension.

The DCA 255 includes an illumination source, an imaging device, and a controller. The illumination source emits light onto an area surrounding the NED 205. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 205, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 220 are objects located in specific positions on the NED 205 relative to one another and relative to a specific reference point on the NED 205. A locator 220 may be a light emitting diode (LED), a corner cube reflector, a reflective marker, a type of light source that contrasts with an environment in which the NED 205 operates, or some combination thereof. In embodiments where the locators 220 are active (i.e., an LED or other type of light emitting device), the locators 220 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 220 are located beneath an outer surface of the NED 205, which is transparent to the wavelengths of light emitted or reflected by the locators 220 or is thin enough not to substantially attenuate the wavelengths of light emitted or reflected by the locators 220. Additionally, in some embodiments, the outer surface or other portions of the NED 205 are opaque in the visible band of wavelengths of light. Thus, the locators 220 may emit light in the IR band under an outer surface that is transparent in the IR band but opaque in the visible band.

The display 225 displays two-dimensional or three-dimensional images to the user in accordance with pixel data received from the console 270 and/or one or more other sources. In various embodiments, the display 225 comprises a single display or multiple displays (e.g., separate displays for each eye of a user). In some embodiments, the display 225 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 225 and used separately, in parallel, and/or in combination.

In some embodiments, the display 225 can display a live image of the scene captured by an imaging device incorporated into the NED system 200 (e.g., the imaging device in the depth camera assembly 255), which may include virtual objects that correspond to real-world objects in the physical space or purely virtual objects that are generated for the XR environment. In some embodiments, the display 225 can be connected to a dedicated camera or imaging device configured within the NED system 200 (not shown in FIG. 2). In some embodiments, the display 225 can also display images or video captured by the imaging device or camera(s) 295.

In some embodiments, a cursor is associated with the display 225 and can be controlled through the I/O interface 275 to select and/or highlight certain portions of the display 225. For example, a mouse may be connected through the I/O interface 275 to allow a user to select certain objects represented on the display 225. In other embodiments, the NED system 200 can be programmed to recognize finger movement or hand gestures of a user that can be used to select objects within an image. For example, finger tracker module 212 can be used in conjunction with camera(s) 295 to recognize and interpret a user's finger and hand movement. The user's finger movements and hand gestures can then be used to control the cursor and select virtual objects displayed on the display 225.

The optical assembly 230 magnifies image light received from the display 225, corrects optical errors associated with the image light, and presents the corrected image light to a user of the NED 205. The optical assembly 230 includes a plurality of optical elements. For example, one or more of the following optical elements may be included in the optical assembly 230: an aperture, a Fresnel lens, a convex lens, a concave lens, a filter, a reflecting surface, or any other suitable optical element that deflects, reflects, refracts, and/ or in some way alters image light. Moreover, the optical assembly 230 may include combinations of different optical elements. In some embodiments, one or more of the optical elements in the optical assembly 230 may have one or more coatings, such as partially reflective or antireflective coatings.

In some embodiments, the optical assembly 230 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 225 is pre-distorted, and the optical assembly 230 corrects the distortion as image light from the display 225 passes through various optical elements of the optical assembly 230. In some embodiments, optical elements of the optical assembly 230 are integrated into the display 225 as a projection assembly that includes at least one waveguide coupled with one or more optical elements.

The IMU 240 is an electronic device that generates data indicating a position of the NED 205 based on measurement signals received from one or more of the position sensors 235 and from depth information received from the DCA 255. In some embodiments of the NED 205, the IMU 240 may be a dedicated hardware component. In other embodiments, the IMU 240 may be a software component implemented in one or more processors. The IMU 240 may, for example, be used to determine the position of the NED 205 with respect to a real-world object that is virtually represented in the XR environment. The relative position of the NED 205 can be used to determine the location where a virtual representation of the real-world object can be displayed on display 225.

In operation, a position sensor 235 generates one or more measurement signals in response to a motion of the NED 205. Examples of position sensors 235 include: one or more accelerometers, one or more gyroscopes, one or more magnetometers, one or more altimeters, one or more inclinometers, and/or various types of sensors for motion detection, drift detection, and/or error detection. The position sensors 235 may be located external to the IMU 240, internal to the IMU 240, or some combination thereof. The position sensor 235 can be used in conjunction with finger tracker module 212 to determine the hand movement of a user.

Based on the one or more measurement signals from one or more position sensors 235, the IMU 240 generates data indicating an estimated current position of the NED 205 relative to an initial position of the NED 205. For example, the position sensors 235 include multiple accelerometers to measure translational motion (forward/back, up/down, left/ right) and multiple gyroscopes to measure rotational motion (e.g., pitch, yaw, and roll). In some embodiments, the IMU 240 rapidly samples the measurement signals and calculates the estimated current position of the NED 205 from the sampled data. For example, the IMU 240 integrates the measurement signals received from the accelerometers over time to estimate a velocity vector and integrates the velocity vector over time to determine an estimated current position of a reference point on the NED 205. Alternatively, the IMU 240 provides the sampled measurement signals to the console 270, which analyzes the sample data to determine one or more measurement errors. The console 270 may further transmit one or more of control signals and/or measurement errors to the IMU 240 to configure the IMU 240 to correct and/or reduce one or more measurement errors (e.g., drift errors). The reference point is a point that may be used to describe the position of the NED 205. The reference point may generally be defined as a point in space or a position related to a position and/or orientation of the NED 205. As noted previously, this reference point can be used to determine the location, including the depth, at which various virtual objects with an XR environment may be represented.

In various embodiments, the IMU 240 receives one or more parameters from the console 270. The one or more parameters are used to maintain tracking of the NED 205. Based on a received parameter, the IMU 240 may adjust one or more IMU parameters (e.g., a sample rate). In some embodiments, certain parameters cause the IMU 240 to update an initial position of the reference point so that it corresponds to a next position of the reference point. Updating the initial position of the reference point as the next calibrated position of the reference point helps reduce drift errors in detecting a current position estimate of the IMU 240.

In various embodiments, the eye tracking system 245 is integrated into the NED 205. The eye-tracking system 245 may comprise one or more illumination sources (e.g., infrared illumination source, visible light illumination source) and one or more imaging devices (e.g., one or more cameras). In operation, the eye tracking system 245 generates and analyzes tracking data related to a user's eyes as the user wears the NED 205. In various embodiments, the eye tracking system 245 estimates the angular orientation of the user's eye. The orientation of the eye corresponds to the direction of the user's gaze within the NED 205. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and +4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 245 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 205 on a user's head. The eye tracking system 245 may also detect the torsion of the eye, i.e., rotation of the eye about the pupillary axis. The eye tracking system 245 may use the detected torsion of the eye to estimate the orientation of the foveal axis from the pupillary axis. The eye tracking system 245 may also track a change in the shape of the eye, which may be approximated as a skew or scaling linear transform or a twisting distortion (e.g., due to torsional deformation). The eye tracking system 245 may estimate the foveal axis based on some combination of the angular orientation of the pupillary axis, the translation of the eye, the torsion of the eye, and the current shape of the eye.

As the orientation may be determined for both eyes of the user, the eye tracking system 245 is able to determine where the user is looking. The NED 205 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 250 is integrated into the NED 205. The varifocal module 250 may be communicatively coupled to the eye tracking system 245 in order to enable the varifocal module 250 to receive eye tracking information from the eye tracking system 245. The varifocal module 250 may further modify the focus of image light emitted from the display 225 based on the eye tracking information received from the eye tracking system 245. Accordingly, the varifocal module 250 can reduce vergence-accommodation conflict that may be produced as the user's eyes resolve the image light. In various embodiments, the varifocal module 250 can be interfaced (e.g., either mechanically or electrically) with at least one optical element of the optical assembly 230.

In operation, the varifocal module 250 may adjust the position and/or orientation of one or more optical elements in the optical assembly 230 in order to adjust the focus of image light propagating through the optical assembly 230. In various embodiments, the varifocal module 250 may use eye tracking information obtained from the eye tracking system 245 to determine how to adjust one or more optical elements in the optical assembly 230. In some embodiments, the varifocal module 250 may perform foveated rendering of the image light based on the eye tracking information obtained from the eye tracking system 245 in order to adjust the resolution of the image light emitted by the display 225. In this case, the varifocal module 250 configures the display 225 to display a high pixel density in a foveal region of the user's eye-gaze and a low pixel density in other regions of the user's eye-gaze.

In some embodiments, one or more cameras 295 are integrated into the NED 205. The cameras 295 can either be a part of the DCA 255 or they can be separate imaging devices. The cameras 295 are used by the NED 205 to, among other things, acquire images of users' hands and determine the manner in which the users are moving their hands. The cameras 295 can also be used to capture images of real-world objects in the physical environment that are to be represented in the XR environment. In one embodiment, several different cameras can be affixed to the NED 205 to capture both real-world objects and the user's movements from a number of different angles.

In some embodiments, a finger tracker module 212 can be configured to perform computations on one or more images or frames captured by the cameras 295 to determine the user's finger movements and/or hand gestures. For example, in some embodiments, where the user's thumb movements are used to mimic mouse movements and control a cursor in the XR environment, the finger tracker module 212 can use image associated with frames captured by cameras 295 to perform calculations and determine the manner in which the users are moving their thumbs. Similarly, in some embodiments, a user's index finger can be monitored, where the index finger movements may determine whether a user is performing a clicking or double-clicking gesture or where, for example, the index finger may be used to control cursor movements using the virtual trackpad. In some embodiments, other finger movements and hand gestures may also correspond to various actions, which the finger tracker module 212 can detect and interpret. Users can configure the sensitivity settings for the finger tracker module 212, allowing them to adjust how pronounced their finger movements need to be before the module recognizes them as commands, for example, to move the cursor or perform a click.

In some embodiments, a hand model generator module 213 can be programmed to create a virtual representation of user's hands. The hand model generator module 213 in conjunction with the cameras 295 are used to track the user's hands and associated gestures and represent them virtually in the XR environment. Creating a virtual model of the user's hand in the XR environment allows the virtual trackpad engine 285 to determine instances where the user's virtual hands make contact with the virtual trackpad. Generating a virtual model of the user's hands also allows the finger tracker module 212 to track the finger movements of the user using the virtual representations of the user's hands.

In certain embodiments, a surface detector module 214 can be configured to enhance user ergonomics and provide haptic feedback by mapping or "locking" the virtual trackpad to a pre-existing real-world surface. The mapping of the virtual trackpad to a physical object can be performed in one of various ways including object tracking or object mapping using a deep learning process. Users may indicate a surface or object in the physical world, such as a table or mousepad, to which the virtual trackpad can be locked. Subsequently, users can perform finger movements or hand gestures against the selected surface, and receive haptic feedback in response to their actions. This feature promotes user comfort and allows them to mimic the same motions as they would with a traditional mouse or physical trackpad. By providing a tangible surface in the physical world, users can rest their hands comfortably and perform actions with greater ease.

The I/O interface 275 facilitates the transfer of action requests from a user to the console 270. In addition, the I/O interface 275 facilitates the transfer of device feedback from the console 270 to the user. An action request is a request to perform a particular action. For example, an action request may be an instruction to start or end capture of image or video data or an instruction to perform a particular action within an application, such as pausing video playback, increasing or decreasing the volume of audio playback, initiating and pausing transcription of the audio, switching the camera between privacy mode and normal mode, and so forth. In various embodiments, the I/O interface 275 may include one or more input devices. Example input devices include: a keyboard, a mouse, a game controller, a joystick, and/or any other suitable device for receiving action requests and communicating the action requests to the console 270. In some embodiments, the I/O interface 275 includes an IMU 240 that captures calibration data indicating an estimated current position of the I/O interface 275 relative to an initial position of the I/O interface 275. Note that while input devices can be connected to the console 270 through the I/O interface 275, in some embodiments where the NED system 200 is configured to detect and recognize hand gestures and finger movement, they may not be required. For example, as discussed above, the NED system 200 is able to forego the use of input devices such as joysticks by providing a virtual trackpad that allows a user to control virtual objects at a distance within the XR environment. In some embodiments, input devices may be connected to the NED system 200 through I/O interface 275, but they may be used for purposes other than controlling a pointer and selecting objects within the XR environment.

In operation, the I/O interface 275 receives action requests from the user and transmits those action requests to the console 270. Responsive to receiving the action request, the console 270 performs a corresponding action. For example, responsive to receiving an action request, console 270 may configure I/O interface 275 to emit haptic feedback onto an arm of the user. For example, console 270 may configure I/O interface 275 to deliver haptic feedback to a user when an action request is received. Additionally or alternatively, the console 270 may configure the I/O interface 275 to generate haptic feedback when the console 270 performs an action, responsive to receiving an action request.

The console 270 provides content to the NED 205 for processing in accordance with information received from one or more of: the DCA 255, the eye tracking system 245, one or more other components of the NED 205, and the I/O interface 275. In the embodiment shown in FIG. 2, the console 270 includes an application store 260 and an engine 265. In the embodiment shown in FIG. 2, the engine 265 comprises a virtual trackpad engine 285. Various embodiments include a virtual trackpad engine 285 that can perform the necessary computations to determine the actions being performed by the user using the associated virtual trackpad in the XR environment and executing the instructions associated with those actions. The virtual trackpad engine 285, in some embodiments, can communicate with and control the finger tracker 212, the camera(s) 295, the hand model generator 213 and the surface detector 214 to generate a virtual trackpad in the XR environment and to monitor the user's interactions with the virtual trackpad in the XR environment.

The virtual trackpad engine 285, in certain embodiments, receives finger movement information from the finger tracker module 212. This data is then used to compute and determine responsive actions (e.g., actions related to the cursor) within the XR environment. For instance, the engine can use the movement of the user's thumb (e.g., a slight movement or gesture of the thumb in a specific plane, like the X-Y plane) to emulate the movement of a mouse. By analyzing finger movements, the virtual trackpad engine 285 is able to make necessary calculations and facilitate an intuitive and efficient user experience in the XR environment.

In some embodiments, the virtual trackpad engine 285 utilizes information about the position of the user's virtual hands provided by the hand model generator module 213. This data, along with input from the finger tracker module 212, can determine responsive actions within the XR environment. For instance, by analyzing the data related to the virtual hands and finger movements in conjunction with information about the virtual trackpad's placement generated by the virtual trackpad engine 285, it can be determined whether to move the cursor or pointer pointing at a distant GUI within the XR environment and the appropriate movement required.

In some embodiments, the virtual trackpad engine 285 can leverage inputs from the camera(s) 295 and the surface detector module 214 to determine a suitable real-world object or physical asset to which the virtual trackpad can be mapped, as well as allowing the user to select the object to use. Once the virtual trackpad is locked or mapped to a real-world object, the virtual trackpad engine 285, in some embodiments, tracks the user's hand movements (e.g., against the surface of the real-world object) by using data from the finger tracker module 212, the cameras 295, and the surface detector 214. By doing so, it can establish how the cursor should move within the XR environment.

In some embodiments, the virtual trackpad engine 285 uses information gathered from the camera(s) 295 about the physical environment to establish the ideal location within the XR environment to display the virtual trackpad. This requires positioning the virtual trackpad in an area that is easily accessible by the user's virtual hands, while avoiding overlap with any physical assets that must be represented virtually in the XR environment. In some embodiments, displaying the virtual trackpad is optional and based on user-selection. Accordingly, the virtual trackpad engine 285 may receive an action request through I/O interface 275 to turn the virtual trackpad on or off depending on the user's preferences or application.

In some embodiments, the console 270 may have additional, fewer, or different modules and/or components than those described in conjunction with FIG. 2. Similarly, the functions further described below may be distributed among components of the console 270 in a different manner than described in conjunction with FIG. 2.

The application store 260 stores one or more applications for execution by the console 270. An application is a group of instructions that, when executed by a processor, performs a particular set of functions, such as generating content for presentation to the user. For example, an application may generate content in response to receiving inputs from a user (e.g., via movement of the NED 205 as the user moves his/her head, via the I/O interface 275, etc.). Examples of applications include: gaming applications, conferencing applications, video playback applications, or other suitable applications.

In some embodiments, the engine 265 generates a three-dimensional mapping of the area surrounding the NED 205 (i.e., the "local area") based on information received from the NED 205. In some embodiments, the engine 265 determines depth information for the three-dimensional mapping of the local area based on depth data received from the NED 205. In various embodiments, the engine 265 uses depth data received from the NED 205 to update a model of the local area and to generate and/or modify media content based in part on the updated model of the local area. The three-dimensional mapping of the area, in some embodiments, can be used by the virtual trackpad engine 285 to determine a location in the XR environment in which to place the virtual trackpad.

The engine 265 also executes applications within the NED system 200 and receives position information, acceleration information, velocity information, predicted future positions, eye-gaze information, or some combination thereof, of the NED 205. Based on the received information, the engine 265 determines various forms of media content to transmit to the NED 205 for presentation to the user. For example, if the received information indicates that the user has looked to the left, the engine 265 generates media content for the NED 205 that mirrors the user's movement in a virtual environment or in an environment augmenting the local area with additional media content. Accordingly, the engine 265 may generate and/or modify media content (e.g., visual and/or audio content) for presentation to the user. The engine 265 may further transmit the media content to the NED 205. Additionally, in response to receiving an action request from the I/O interface 275, the engine 265 may perform an action within an application executing on the console 270. The engine 265 may further provide feedback when the action is performed. For example, the engine 265 may configure the NED 205 to generate visual and/or audio feedback and/or the I/O interface 275 to generate haptic feedback to the user.

In some embodiments, based on the eye tracking information (e.g., orientation of the user's eye) received from the eye tracking system 245, the engine 265 determines a resolution of the media content provided to the NED 205 for presentation to the user on the display 225. The engine 265 may adjust a resolution of the visual content provided to the NED 205 by configuring the display 225 to perform foveated rendering of the visual content, based at least in part on a direction of the user's gaze received from the eye tracking system 245. The engine 265 provides the content to the NED 205 having a high resolution on the display 225 in a foveal region of the user's gaze and a low resolution in other regions, thereby reducing the power consumption of the NED 205. In addition, using foveated rendering reduces a number of computing cycles used in rendering visual content without compromising the quality of the user's visual experience. In some embodiments, the engine 265 can further use the eye tracking information to adjust a focus of the image light emitted from the display 225 in order to reduce vergence-accommodation conflicts.

Figure 3A:
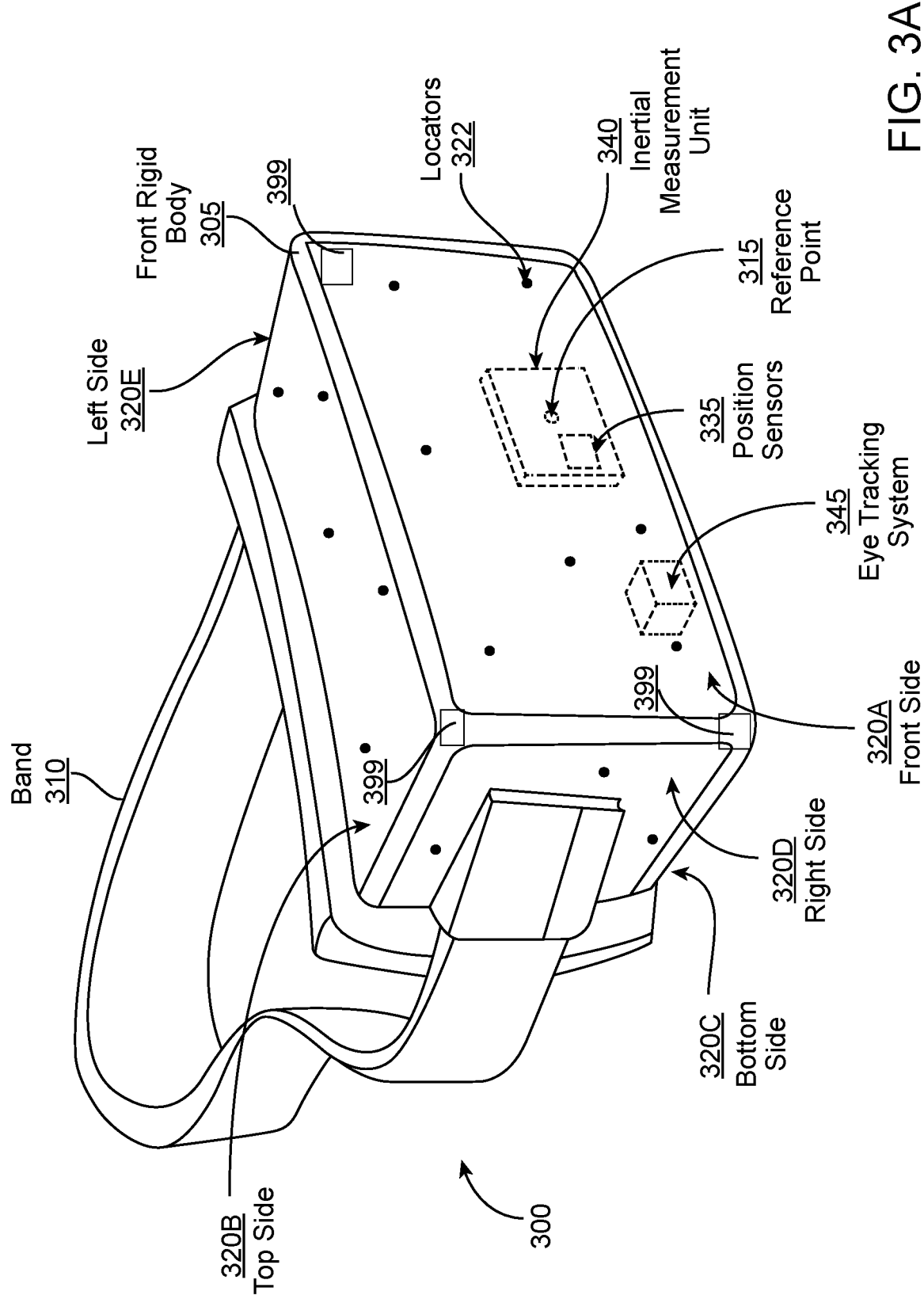
FIG. 3A is a diagram of an NED 300, according to various embodiments.

FIG. 3A is a diagram of an NED 300, according to various embodiments. In various embodiments, NED 300 presents media to a user. The media may include visual, auditory, and haptic content. In some embodiments, NED 300 provides artificial reality or extended reality (e.g., virtual reality) content by providing a real-world environment and/or computer-generated content. In some embodiments, the computer-generated content may include visual, auditory, and haptic information.

Persons of ordinary skill in the art will understand that NED 300 may comprise a see-through NED. A see-through NED leave the user's view of the real world open and create either a transparent image or a small opaque image that blocks only a small portion of the user's peripheral vision. The see-through category typically comprises augmented reality headsets and smart glasses. Augmented reality headsets typically have a 20 to 60 degree field of view and overlay information and graphics on top of the user's view of the real world. Smart glasses typically have a smaller field of view and a display at which the user glances periodically rather than looking through the display continuously.

The NED 300 is an embodiment of the NED 205 and includes a front rigid body 305 and a band 210. The front rigid body 305 includes an electronic display element of the electronic display 225 (not shown in FIG. 3A), the optics assembly 230 (not shown in FIG. 3A), the IMU 340, the cameras 399, the one or more position sensors 335, the eye tracking system 345, and the locators 322. In the embodiment shown by FIG. 3A, the position sensors 335 are located within the IMU 340, and neither the IMU 340 nor the position sensors 335 are visible to the user. The IMU 340, the position sensors 335, the cameras 399, the eye tracking system 345, and the locators 322, perform substantially the same function as the respective elements IMU 240, position sensors 235, the cameras 295, the eye tracking system 245 and the locators 220 in FIG. 2.

The locators 322 are located in fixed positions on the front rigid body 305 relative to one another and relative to a reference point 315. In the example of FIG. 3A, the reference point 315 is located at the center of the IMU 340. Each of the locators 322 emits light that is detectable by the imaging device in the DCA 255. The locators 322, or portions of the locators 322, are located on a front side 320A, a top side 320B, a bottom side 320C, a right side 320D, and a left side 320E of the front rigid body 305 in the example of FIG. 3A.

The NED 300 includes the eye tracking system 345. As discussed above, the eye tracking system 345 may include a structured light generator that projects an interferometric structured light pattern onto the user's eye and a camera to detect the illuminated portion of the eye. The structured light generator and the camera may be located off the axis of the user's gaze. In various embodiments, the eye tracking system 345 may include, additionally or alternatively, one or more time-of-flight sensors and/or one or more stereo depth sensors. In FIG. 3A, the eye tracking system 345 is located below the axis of the user's gaze, although the eye tracking system 345 can alternately be placed elsewhere. Also, in some embodiments, there is at least one eye tracking unit for the left eye of the user and at least one tracking unit for the right eye of the user.

In various embodiments, the eye tracking system 345 includes one or more cameras on the inside of the NED 300. The camera(s) of the eye tracking system 345 may be directed inwards, toward one or both eyes of the user while the user is wearing the NED 300, so that the camera(s) may image the eye(s) and eye region(s) of the user wearing the NED 300. The camera(s) may be located off the axis of the user's gaze. In some embodiments, the eye tracking system 345 includes separate cameras for the left eye and the right eye (e.g., one or more cameras directed toward the left eye of the user and, separately, one or more cameras directed toward the right eye of the user).

Figure 3B:
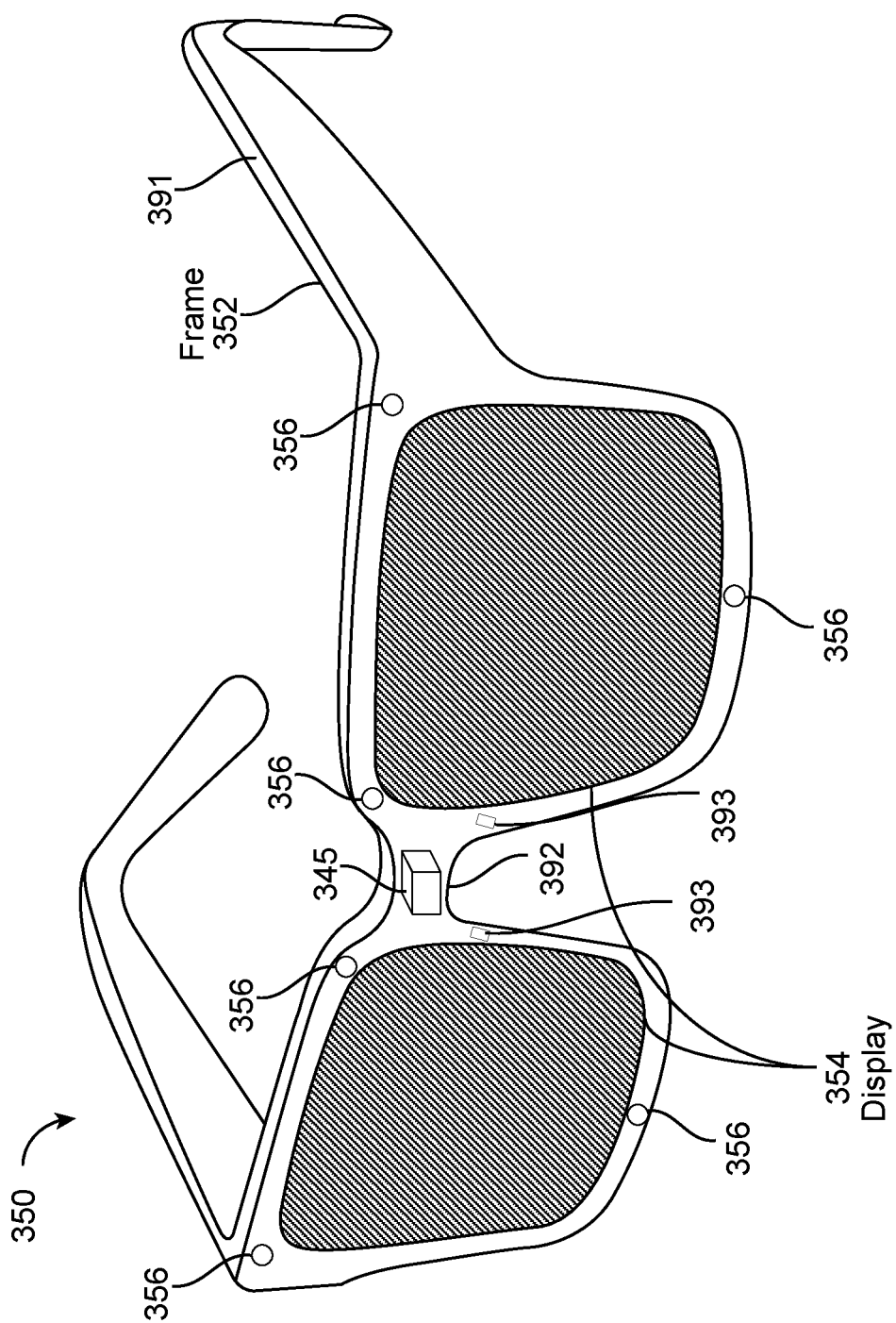
FIG. 3B is a diagram of an NED 350, according to various embodiments. In various embodiments, NED 350 presents media to a user.

FIG. 3B is a diagram of an NED 350, according to various embodiments. In various embodiments, NED 350 presents media to a user. The media may include visual, auditory, and haptic content. In some embodiments, NED 350 provides artificial reality (e.g., augmented reality or extended reality) content by providing a real-world environment and/or computer-generated content. In some embodiments, the computer-generated content may include visual, auditory, and haptic information. The NED 350 is an embodiment of the NED 205. In one embodiment, the NED 350 includes see-through smart glasses. In one embodiment, the NED 350 is configured with a camera or imaging device and is able to present a live image of an XR environment on a display 354 of the NED 350, where the XR environment can include elements of the surrounding physical environment overlaid with virtual objects including an option virtual trackpad.

NED 350 includes frame 352 and the display 354. In various embodiments, the NED 350 may include one or more additional elements. Display 354 may be positioned at different locations on the NED 350 than the locations illustrated in FIG. 3B. Display 354 is configured to provide content to the user, including audiovisual content. In some embodiments, one or more displays 354 may be located within frame 352. As noted above, in some embodiments, a user may be able to interact with a virtual trackpad visible on the display in order to control one or more virtual GUIs and associated elements that are distant and outside the reach of the user.

NED 350 further includes eye tracking system 345 and one or more corresponding modules 356. The modules 356 may include emitters (e.g., light emitters) and/or sensors (e.g., image sensors, cameras). In various embodiments, the modules 356 are arranged at various positions along the inner surface of the frame 352, so that the modules 356 are facing the eyes of a user wearing the NED 350. For example, the modules 356 could include emitters that emit structured light patterns onto the eyes and image sensors to capture images of the structured light pattern on the eyes. As another example, the modules 356 could include multiple time-of-flight sensors for directing light at the eyes and measuring the time of travel of the light at each pixel of the sensors. As a further example, the modules 356 could include multiple stereo depth sensors for capturing images of the eyes from different vantage points. In various embodiments, the modules 356 also include image sensors for capturing 2D images of the eyes.

In some embodiments, the cameras 393 may be disposed on the nose pad 392 of the NED 350 or in any suitable position to be able to capture a clear view of a user's hands and associated hand gestures. Cameras 393 perform substantially the same function as the cameras 295 located in FIG. 2.

Virtual Trackpad Engine

Figure 4:
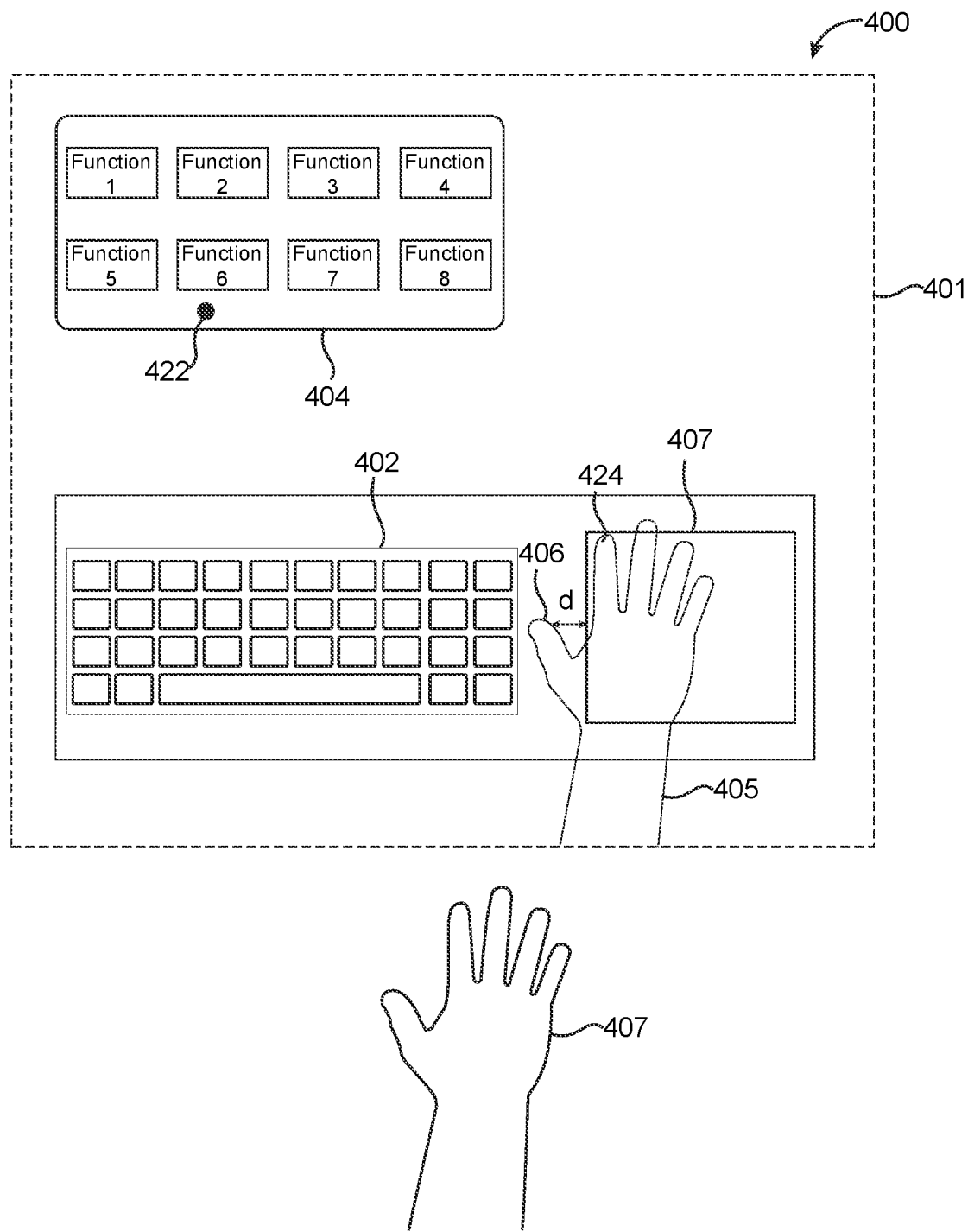
FIG. 4 illustrates the manner in which virtual hands associated with a user can interact with a virtual trackpad, according to various embodiments.

FIG. 4 illustrates the manner in which virtual hands associated with a user can interact with a virtual trackpad, according to various embodiments. As shown in FIG. 4, within the XR environment 400, a user's hand 407 (in the physical world) can be virtually represented as a virtual hand 405 within a display 401 in the XR environment 400. The display 401 may be presented to a user via, for example, smart glasses or a wearable headset. While certain virtual objects, such as the virtual keyboard 402 displayed within the XR environment 400, are within reach of the user's virtual hand 405, other virtual objects (e.g., certain graphical user interfaces (GUIs) such as GUI 404) may be located at a distance and outside the reach of the user's virtual hand 405.

As noted above, in some embodiments, the virtual trackpad engine 285 performs the computations necessary to determine a location in the XR environment 400 where the virtual trackpad 407 can be positioned. Furthermore, in some embodiments, the hand model generator module 213 of FIG. 2 generates a representation of the user's virtual hand 405.

In some embodiments, the virtual trackpad 407 is designed to activate and respond to virtual hand 405 movements only when the user's virtual thumb 406 (or another finger designated based on a user's preferences) is within a specified proximity threshold (e.g., "d" as shown in FIG. 4). The threshold distance "d" can be calculated along any of the x, y, or z axes. For example, the virtual trackpad 407 can activate if the user's virtual hands approach the trackpad from above (e.g., in the z-direction) or from the side (e.g., in the x-direction as shown in FIG. 4). Note that the virtual trackpad 407 can also be activated when the user's virtual hand 405 in general is within the specified proximity threshold.

Some embodiments closely monitor the output from camera(s) 295 and finger tracker module 212 when the virtual trackpad 407 is activated. Prior to activation, the relative finger movements of the user's virtual hands are less critical than after activation. Once activated, it becomes crucial to monitor the user's finger movements closely due to their expectation that any finger movement will elicit a responsive action (e.g., cursor movement) in the XR environment.

Figure 5:
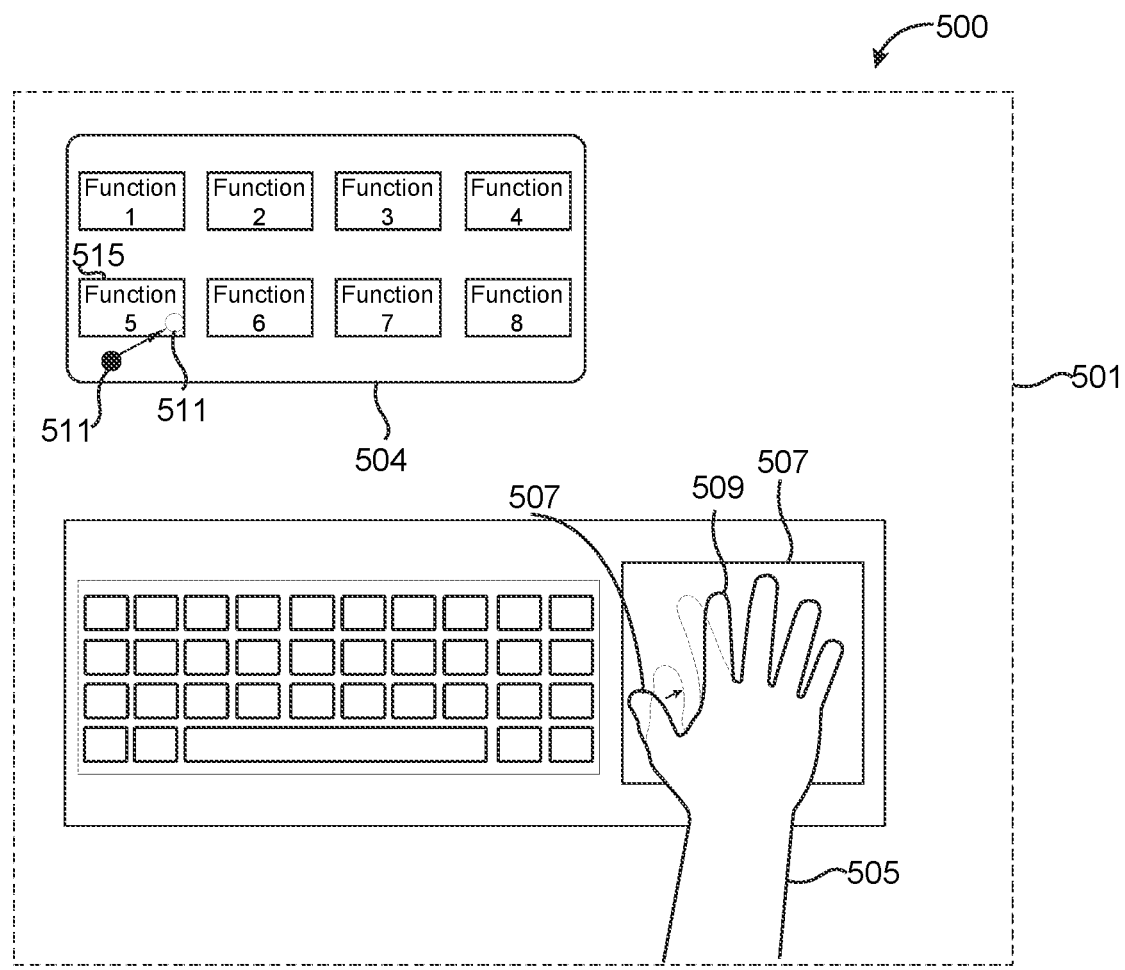
FIG. 5 illustrates the manner in which finger movements translate into specific actions within the XR environment, according to various embodiments.

FIG. 5 illustrates the manner in which finger movements translate into specific actions within the XR environment, according to various embodiments. As shown in FIG. 5, within the XR environment 500, a user's hand can be virtually represented as a virtual hand 505 within a display 501 in the XR environment 500. Further, certain virtual objects (e.g., certain graphical user interfaces (GUIs) such as GUI 504) may be located at a distance and outside the reach of the user's virtual hand 505.

In some embodiments, once the virtual trackpad 507 is activated, the virtual trackpad engine 285 can utilize a combination of finger tracker module 212 and cameras 295 from FIG. 2 to translate any finger or hand gestures into corresponding actions in the XR environment. For instance, a movement of the virtual thumb 507 can move a cursor 511, and a specific gesture of the virtual index finger 509 can indicate a user's clicking (or double-clicking) action. Additionally, some embodiments may store information regarding specific hand gestures recorded after the virtual trackpad has activated and compare it with a predetermined set of hand gestures stored within the virtual trackpad engine 285 of FIG. 2. If there is a match, the corresponding action associated with the matching predetermined hand gesture is performed. In some embodiments, the cursor 511 is configured to stay hidden (and not visible on the display 501) until the virtual trackpad 507 is activated or accessed.

In various embodiments, users may receive auditory or haptic feedback to indicate when the virtual trackpad 507 is activated or deactivated. Additionally, certain visual effects may be employed by the virtual trackpad engine 285 to provide a more realistic experience to the user. For instance, the virtual hand 505 may be intentionally slowed down in relation to the user's physical hand movement when in contact with the virtual trackpad 507, mimicking the effect of friction when interacting with a physical trackpad. Moreover, when the virtual hand 505 is in proximity to the virtual trackpad 507, it may be slowed down in the z-direction to give the impression of solidity and prevent it from passing through the virtual trackpad 507 without any resistance.

In some embodiments, once the virtual trackpad 507 is activated or engaged (e.g., by the virtual set of hands making contact with the virtual trackpad 507 or being within a threshold level of proximity), the virtual trackpad engine 285 utilizes the relative movement of the thumb 507 (or another finger that the user has designated as the active finger) to determine the corresponding movement of the cursor 511. For example, a movement of the thumb in the manner shown in FIG. 5 may move the cursor 511 from its original position to a position directly over the "Function 5" icon 515. Moreover, the virtual trackpad engine 285 in conjunction with the finger tracker module 212 monitors the relative motion of the index finger 509 (or any other finger designated by the user) to detect whether the user intends to select an item with a click. For example, a movement of the index finger 509 as shown in FIG. 5 (e.g., emulating a traditional mouse click) can result in the selection of the "Function 5" icon 515 (where the cursor is already hovering over the "Function 5" icon 515). In some embodiments, a gain may be necessary to map the relative finger movement to a larger GUI cursor movement (e.g., in cases where a size of the virtual trackpad 507 of a relative magnitude of the user's virtual hand movements may be smaller than the GUI to which the virtual trackpad 507 is mapped). This approach of using the relative movement of the thumb or the index finger to move the cursor or select an item, respectively, aligns with the standard mouse operation principles.

In some embodiments, the sensitivity settings of the virtual trackpad engine can be adjusted by the user to customize the level of sensitivity of the finger movements required to move the cursor or select an item. This feature allows users to fine-tune the virtual trackpad's sensitivity to match their preference, enabling them to make small or more exaggerated finger movements based on their comfort level. Accordingly, increasing the sensitivity setting can allow the user to experience less fatigue because less exaggerated finger movements are required to accomplish a variety of tasks. As long as the finger movements can be captured by the cameras, they can be translated into corresponding actions in the XR environment.

In some embodiments, a surface of the virtual trackpad 507 is mapped in its entirety to the surface of the GUI, such as GUI 404, where each area of the virtual trackpad 507 correlates to (or matches up with) a specific location in the GUI 504. As a result, when the user touches a specific portion of the virtual trackpad 507, the cursor moves to the corresponding location on the GUI 504.

In certain embodiments, rather than utilizing the thumb's movement to emulate standard mouse principles, the user may use their index finger to manipulate the virtual trackpad 507, which operates like a traditional trackpad. Moreover, in some embodiments, the NELD system offers the ability to select between two modes: mouse mode or trackpad mode. Depending on the user's preference and the task at hand, they can choose the appropriate mode to interact with the virtual trackpad 507.

Some embodiments enable a virtual mouse to be displayed on the screen (not depicted in FIG. 4 or 5), allowing the user to navigate the XR environment with a familiar interface. If a virtual mouse is presented, the virtual trackpad engine 285 can be programmed to identify a distinct array of hand gestures, enabling users to execute corresponding actions in the XR environment.

Figure 6:
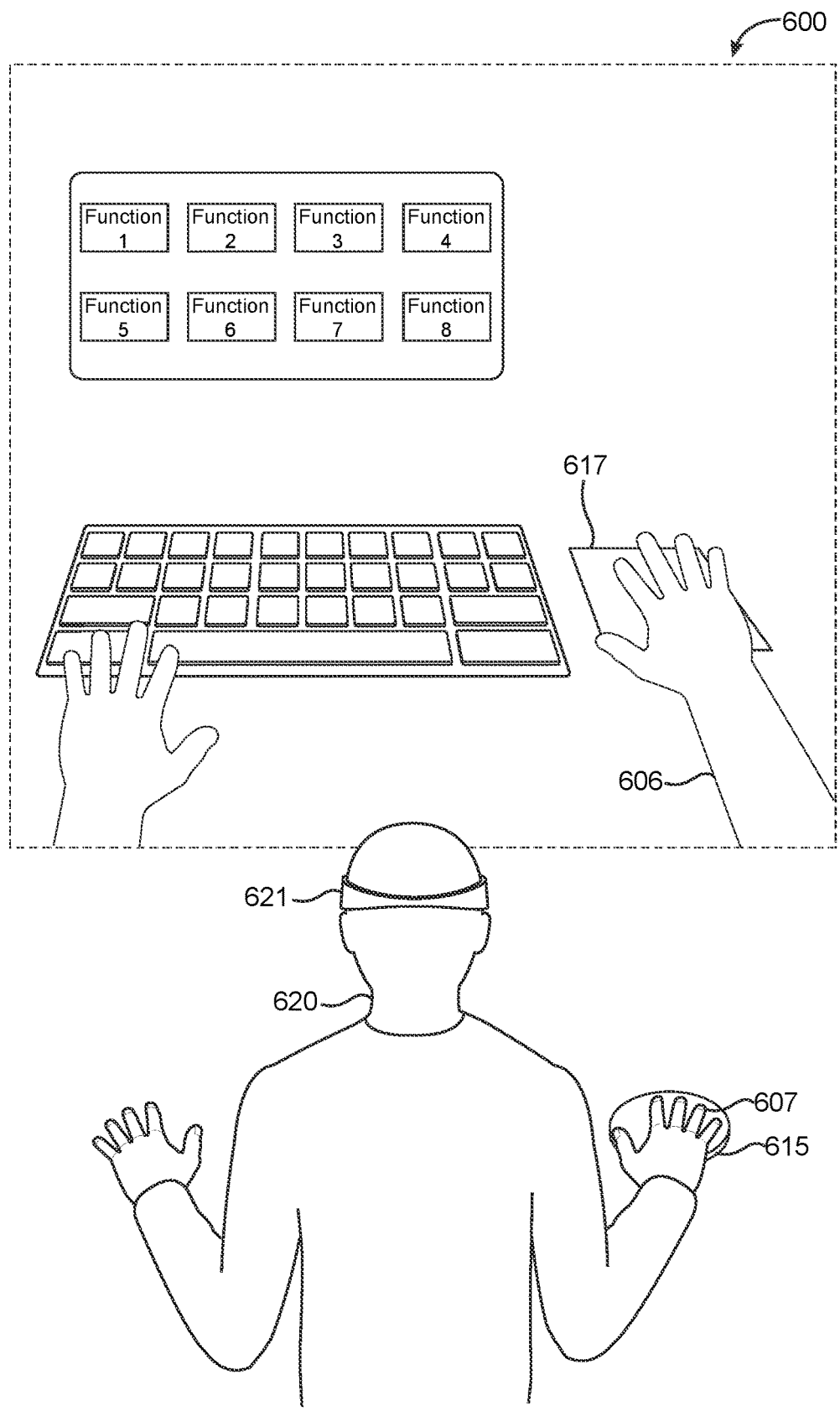
FIG. 6 illustrates the manner in which a virtual trackpad can be mapped to a tangible real-world object, according to various embodiments.

FIG. 6 illustrates the manner in which a virtual trackpad can be mapped to a tangible real-world object, according to various embodiments. As illustrated in FIG. 6, when using the XR environment 600, a user 620 with a head-mounted NED system 621 may opt to map or lock the virtual pad 617 to a physical object 607 in the real world. Examples of a physical object 607 include the surface of a table or an actual object such as a mousepad, writing pad, or any other physical object in the environment. The advantages of mapping the virtual trackpad 617 to a physical object are twofold: it provides haptic feedback from the tangible object and enables the user to rest their physical hand on the physical object, leading to enhanced ergonomics.

Figure 7:
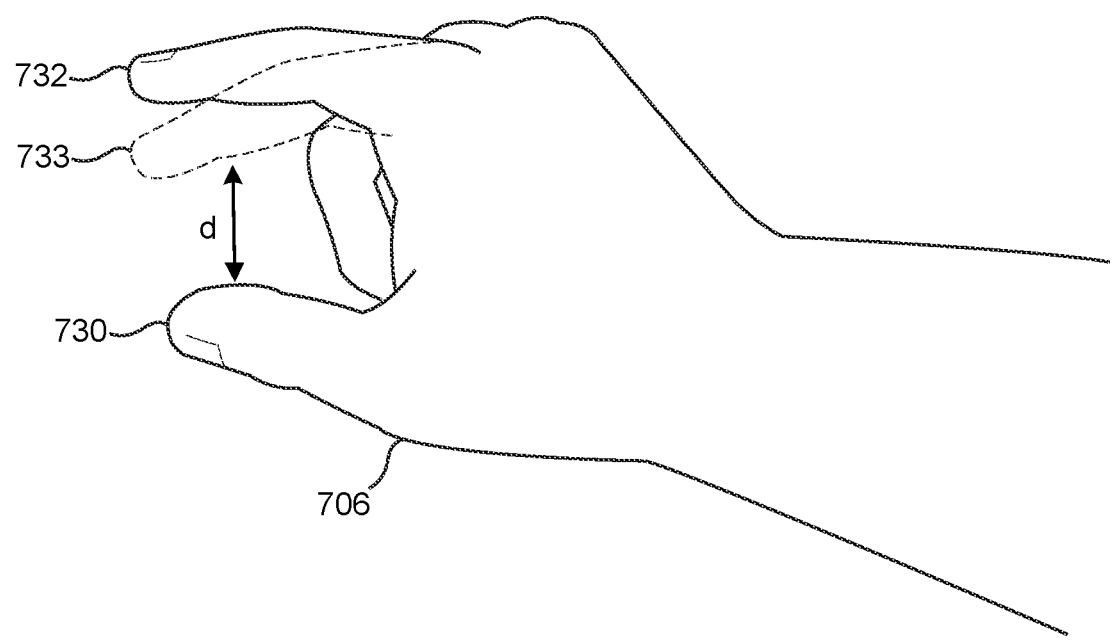
FIG. 7 illustrates the manner in which a clicking action is recognized responsive to a movement of the index finger, according to various embodiments.

FIG. 7 illustrates the manner in which a clicking action is recognized responsive to a movement of the index finger, according to various embodiments. As mentioned previously, the finger tracker module 212 is adept at capturing finger movements and determining the appropriate action associated with the finger movement. One of the finger movements, for example, that the finger tracker module 212 needs to be able to recognize is a clicking motion performed by a user's index finger.

In some embodiments, the finger tracker module 212 recognizes a clicking motion when a user's index finger 732 moves down in the z-direction (or along the z-plane) towards the direction of a user's thumb 730 resting in a threshold proximity to an activated virtual pad (not shown in FIG. 6). The "click" is identified when the index finger releases back away in the same direction within a given threshold of time. As shown in FIG. 6, for example, the index finger 732 on a user's virtual hand 706 can, for example, move in the z-direction towards the user's virtual thumb 730. Note that the virtual thumb may already be in sufficient proximity to a virtual pad to activate it. Alternatively, in some embodiments, a virtual pad may not need to be activated to identify the user click as long as the index finger (or some portion of the user's virtual hand 706) approaches within the threshold proximity of the virtual pad during the clicking motion.

In some embodiments, to recognize the movement of the index finger 732 as a click, the index finger will typically be required to have moved to a location 733 that is at least a minimum distance "d" relative to the virtual thumb 730. Further, the index finger 732 can be required to release and move away from the thumb (either to its original location or relatively near) in the z-direction within a predetermined amount of time to identify as a click. For example, if the index finger 732 moves to location 733 and simply rests there, a click would not be recognized. However, if the index finger 732 moves back up to its original position within a predetermined amount of time, the finger tracker module 212 can accurately recognize the motion as a click. Similar principles may be employed to recognize a "double-clicking" motion with the index finger.

Figure 8:
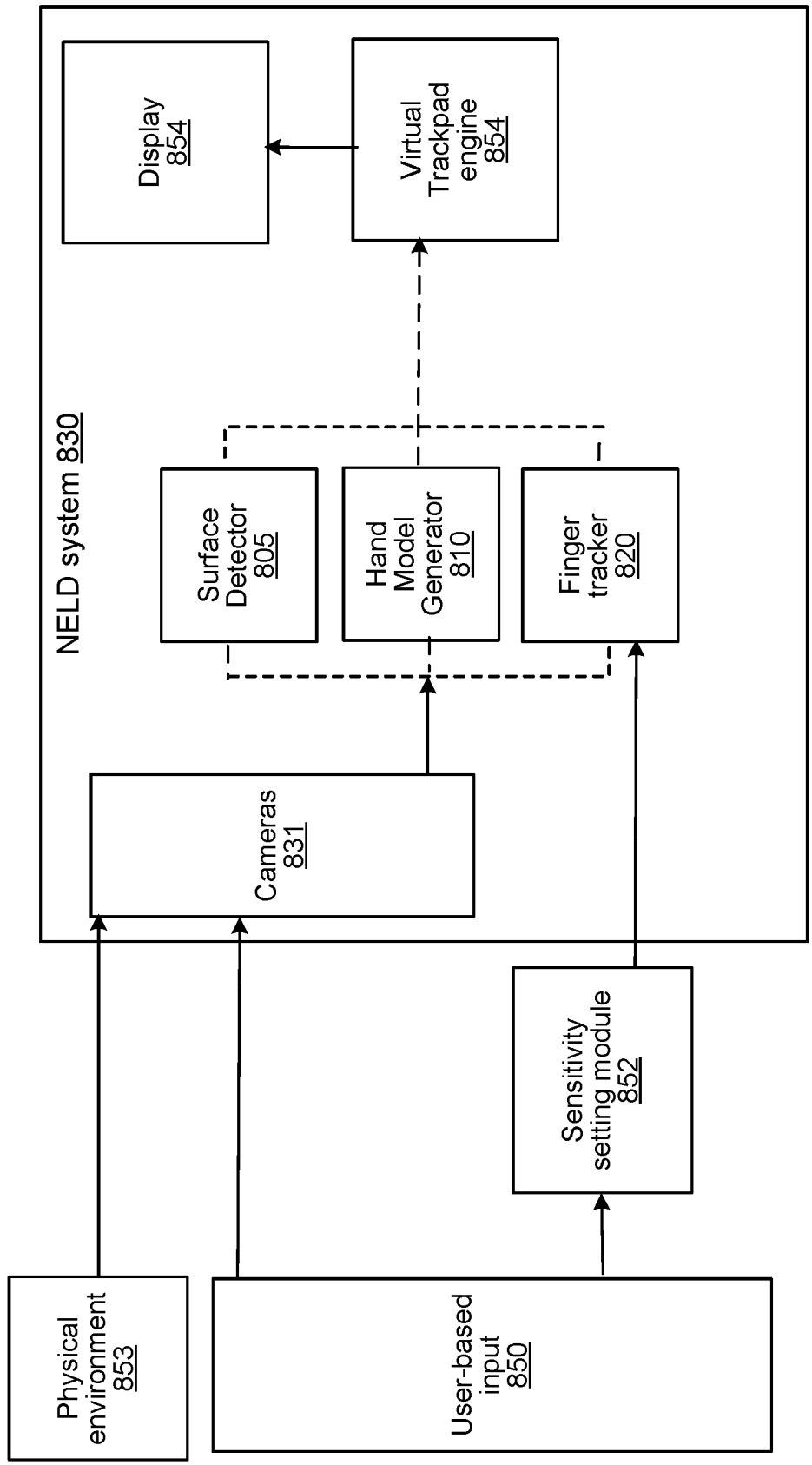
FIG. 8 illustrates a technique for accessing and manipulating distant virtual objects in an XR environment, according to various embodiments.

FIG. 8 illustrates a technique for accessing and manipulating distant virtual objects in an XR environment, according to various embodiments. In some embodiments, one or more cameras 831 in an NELD system 830 may capture details of a physical environment 853 and any user-based input 850 within that environment. As explained earlier, the user-based input 850 can comprise finger movements and hand gestures, however, other types of user input such as facial and other physical gestures may also be contemplated.

In some embodiments, details extracted from the video frames captured by the camera can be used by a hand model generator 810. As explained earlier, the hand model generator generates a virtual representation of the user's physical hands. In some embodiments, a surface detector module 805 can detect physical objects within a user's reach in the physical environment and map the virtual trackpad to the physical object. In some embodiments, the surface detector module 805 is able to perform this mapping automatically or in response to a user's selection or preferences settings. In some embodiments, a finger tracker module 820 is configured to perform computations on one or more images or frames captured by the cameras 831 to determine the user's finger movements and/or hand gestures and associated responsive actions. As described earlier, in some embodiments, a user is able to configure sensitivity settings for the finger tracker module 820 through a sensitivity setting module 852. The sensitivity setting module 852 allows users to adjust how pronounced their finger movements need to be before the module recognizes them as commands, for example, to move the cursor or perform a click.

In some embodiments, the virtual trackpad engine 854 uses the output of the cameras 831 and modules 805, 810 and 820 to generate the virtual hands and a virtual trackpad in the XR environment to be display on display 854 of the NELD system 830. The virtual trackpad engine 854, in some embodiments, may also perform the computations necessary to execute the actions responsive to the user's hand movements. For example, the finger tracker module 820 can determine a corresponding action for a given hand gesture, and the virtual trackpad engine 854 can execute the action in the XR environment and display the results on the display 854.

In some embodiments, the surface detector module 805, the hand model generator 810 and the finger tracker module 820 are each able to use a machine learning model (not show in FIG. 8) to perform their respective tasks. For example, the finger tracker module 820 may use a machine learning model to determine responsive actions that correlate to a user's finger movements or hand gestures. The machine learning model can, in some embodiments, include a pre-trained model. The machine learning model may include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. The machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

Figure 9:
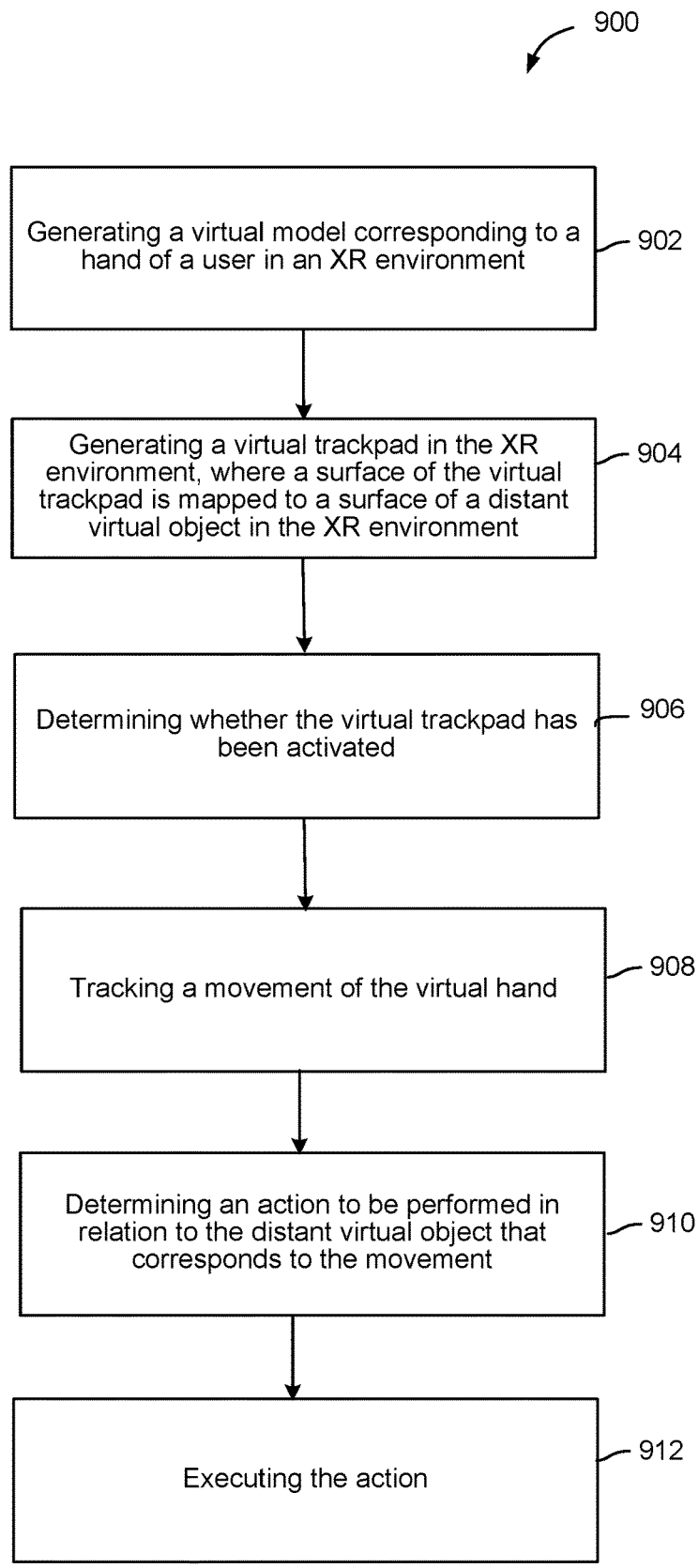
FIG. 9 is a flow diagram of method steps for accessing and manipulating distant virtual objects in an XR environment, according to various embodiments.

FIG. 9 is a flow diagram of method steps for accessing and manipulating distant virtual objects in an XR environment, according to various embodiments. Although the method steps are described with reference to the systems of FIGS. 1-8, persons skilled in the art will understand that any system may be configured to implement the method steps, in any order, in other embodiments.

As shown, a method 900 begins at step 902, where a system (e.g., the NELD 830) generates a virtual model corresponding to a user's physical hand in an XR environment.

At step 904, the system generates a virtual trackpad in the XR environment, where a surface of the virtual trackpad is mapped to a surface of a distant object in the XR environment.

At step 906, the system determines whether the virtual trackpad has been activated. As previously noted, certain embodiments activate the virtual trackpad when a user's virtual thumb approaches within a specified distance.

At step 908, the system tracks a movement of the virtual hand upon activation of the virtual trackpad. For example, finger tracker module 820, as discussed above, can determine if a user has moved their thumb or forefinger, where a movement of the thumb or forefinger emulates the operation of a mouse.

At step 910, the system determines the action that corresponds to the movement to be executed in relation to the distant object. For instance, if the user emulates mouse movement by moving their thumb, the system can determine that the cursor on the distant object should be moved proportionally. Or, for example, if the user emulates mouse operation by clicking their index finger, the system can determine that a click operation should to be performed (e.g., to select an icon or button associated with the distant object).

At step 912, the system executes the action. For example, the system can move the cursor on the surface of the distant object or select an icon on the distant object.

In sum, virtual trackpad engine is configured to perform a technique for accessing and manipulating distant virtual objects in an XR environment. The technique includes generating a model of a user's virtual hands. The technique further includes generating a virtual trackpad that responds to direct touch from the user's virtual hands, where a surface of the visual trackpad is mapped to the surface of a distant virtual object. The technique further includes detecting whether the virtual trackpad has been virtually accessed by the user's virtual hands, with the trackpad becoming responsive once the virtual hands are either touching the trackpad or within a threshold level of proximity. The technique also includes tracking a movement of the user's hands subsequent to the trackpad becoming responsive and monitoring interactions between the user's virtual hands and the virtual trackpad in order to determine the manner in which the distant virtual object should be manipulated.

At least one advantage of the disclosed techniques is that it enables users to interact with virtual objects located at a distance in a more comfortable and ergonomic manner. Unlike computer-vision based hand rays that often require users to assume uncomfortable positions, such as raising their hands, the disclosed techniques rely on thumb or index finger movements to move a cursor and select virtual objects. This feature allows for more precision and accuracy in interacting with virtual objects, regardless of the distance between the user's body and the target. Furthermore, the relative movement of the user's thumb or index finger can be mapped to the movement of the cursor, which enhances the ergonomic and precise interaction. Overall, these techniques provide an optimal user experience for interacting with distant virtual objects within an XR environment.

Any and all combinations of any of the claim elements recited in any of the claims and/or any elements described in this application, in any fashion, fall within the contemplated scope of the present embodiments and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

1. According to some embodiments, a computer-implemented method comprises generating, in an extended reality (XR) environment, a virtual model corresponding to a hand of a user in a physical environment; generating a virtual trackpad in the XR environment, where a surface of the virtual trackpad is mapped to a surface of a distant virtual object in the XR environment; responsive to a determination that the virtual trackpad is activated, tracking a movement of the virtual hand; determining an action to be performed in relation to the distant virtual object that corresponds to the movement; and performing the action.

2. The computer-implemented method according to clause 1 wherein the surface of the virtual trackpad is mapped in its entirety to the surface of the distant virtual object, and wherein each area of the virtual trackpad correlates to a specific location on the distant virtual object.

3. The computer-implemented method according to clause 1 or clause 2, wherein the surface of the virtual trackpad is mapped to the surface of the distant virtual object by utilizing a gain function, and wherein the gain function maps a relative movement of a finger associated with the virtual model to a corresponding action associated with the distant virtual object.

4. The computer-implemented method according to any of clauses 1-3, wherein the relative movement is a movement of the thumb associated with the virtual model and the corresponding action is a movement of a cursor on the surface of the distant virtual object.

5. The computer-implemented method according to any of clauses 1-4, wherein the movement is a movement of the index finger associated with the virtual model and the action is a selection of an item on the surface of the distant virtual object.

6. The computer-implemented method according to any of clauses 1-5, wherein the movement is a movement of the index finger associated with the virtual model and the action is a movement of a cursor on the surface of the distant virtual object.

7. The computer-implemented method according to any of clauses 1-6, wherein determining if the virtual trackpad is activated comprises determining if a thumb associated with the virtual model is within a specified proximity threshold of the virtual trackpad.

8. The computer-implemented method according to any of clauses 1-7, wherein determining if the virtual trackpad is activated comprises determining if a given part of the virtual model is within a specified proximity threshold of the virtual trackpad.

9. The computer-implemented method according to any of clauses 1-8 further comprising: mapping the virtual trackpad to a real-world object.

10. The computer-implemented method according to any of clauses 1-9, wherein sensitivity settings for tracking the movement of the virtual hand are user-configurable.

11. According to some embodiments, one or more non-transitory computer-readable media storing instructions that, when executed by one or more processors, cause the one or more processors to perform the steps of: generating, in an extended reality (XR) environment, a virtual model corresponding to a hand of a user in a physical environment; generating a virtual trackpad in the XR environment, where a surface of the virtual trackpad is mapped to a surface of a distant virtual object in the XR environment; responsive to a determination that the virtual trackpad is activated, tracking a movement of the virtual hand; determining an action to be performed in relation to the distant virtual object that corresponds to the movement; and performing the action.

12. The one or more non-transitory computer-readable media according to clause 11, wherein the surface of the virtual trackpad is mapped in its entirety to the surface of the distant virtual object, and wherein each area of the virtual trackpad correlates to a specific location on the distant virtual object.

13. The one or more non-transitory computer-readable media according to clause 11 or clause 12, wherein the surface of the virtual trackpad is mapped to the surface of the distant virtual object by utilizing a gain function, and wherein the gain function maps a relative movement of a finger associated with the virtual model to a corresponding action associated with the distant virtual object.

14. The one or more non-transitory computer-readable media according any of clauses 11-13, wherein the relative movement is a movement of the thumb associated with the virtual model and the corresponding action is a movement of a cursor on the surface of the distant virtual object.

15. The one or more non-transitory computer-readable media according any of clauses 11-14, wherein the movement is a movement of the index finger associated with the virtual model and the action is a selection of an item on the surface of the distant virtual object.

16. The one or more non-transitory computer-readable media according any of clauses 11-15, wherein the movement is a movement of the index finger associated with the virtual model and the action is a movement of a cursor on the surface of the distant virtual object.

17. The one or more non-transitory computer-readable media according any of clauses 11-16, wherein determining if the virtual trackpad is activated comprises determining if a thumb associated with the virtual model is within a specified proximity threshold of the virtual trackpad.

18. According to some embodiments, a wearable device, comprises: one or more memories that store instructions, and one or more processors that are coupled to the one or more memories and, when executing the instructions, are configured to: generate, in an extended reality (XR) environment, a virtual model corresponding to a hand of a user in a physical environment; generate a virtual trackpad in the XR environment, where a surface of the virtual trackpad is mapped to a surface of a distant virtual object in the XR environment; responsive to a determination that the virtual trackpad is activated, track a movement of the virtual hand; determine an action to be performed in relation to the distant virtual object that corresponds to the movement; and perform the action.

19. The wearable device according to clause 18, wherein the virtual trackpad is displayed in the XR environment generated within a near-eye display (NED) system.

20. The wearable device according to clauses 18 or 19, wherein sensitivity settings for tracking the movement of the virtual hand are user-configurable. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
  obtaining, in an extended reality (XR) environment, a virtual model corresponding to a hand of a user in a physical environment and used to represent a location of a virtual representation of the hand of the user within the XR environment;
  identifying a virtual trackpad in the XR environment, wherein:
    a surface of the virtual trackpad is configured to control a focus selector mapped to a surface of a distant virtual object in the XR environment,
    the virtual trackpad is presented at a first location distinct from the location of the virtual representation of the hand of the user, and
    the virtual trackpad is displayed in the XR environment generated within a near-eye display (NED) system;
  in accordance with a determination that the virtual representation of the hand of the user is within a proximity threshold to the first location of the virtual trackpad, activating the virtual trackpad;
  responsive to a determination that the virtual trackpad is activated, tracking a movement of the virtual representation of the hand and at least one finger associated with the virtual representation of the hand of the user, such that a sensitivity using to track the at least one finger is distinct from a different sensitivity used to track the virtual representation of the hand of the user;
  responsive to a determination that the virtual trackpad is activated, tracking a movement of the virtual representation of the hand and at least one finger associated with the virtual representation of the hand of the user using the sensitivity;
  determining an action to be performed in relation to the distant virtual object that corresponds to the movement; and
  performing the action.

2. The computer-implemented method of claim 1, wherein the surface of the virtual trackpad is mapped in its entirety to the surface of the distant virtual object, and wherein each area of the virtual trackpad correlates to a specific location on the distant virtual object.

3. The computer-implemented method of claim 1, wherein the surface of the virtual trackpad is mapped to the surface of the distant virtual object by utilizing a gain function, and wherein the gain function maps a relative movement of a finger associated with the virtual model to a corresponding action associated with the distant virtual object.

4. The computer-implemented method of claim 3, wherein the relative movement is a movement of a thumb associated with the virtual model and the corresponding action is a movement of a cursor on the surface of the distant virtual object.

5. The computer-implemented method of claim 1, wherein the movement is a movement of an index finger associated with the virtual model and the action is a selection of an item on the surface of the distant virtual object.

6. The computer-implemented method of claim 1, wherein the movement is a movement of an index finger associated with the virtual model and the action is a movement of a cursor on the surface of the distant virtual object.

7. The computer-implemented method of claim 1, wherein determining if the virtual trackpad is activated comprises determining if a thumb associated with the virtual model is within the proximity threshold of the virtual trackpad.

8. The computer-implemented method of claim 1 further comprising: mapping the virtual trackpad to a real-world object.

9. The computer-implemented method of claim 1, wherein sensitivity settings for tracking the movement of the virtual representation of the hand are user-configurable.

10. One or more non-transitory computer-readable media storing instructions that, when executed by one or more processors, cause the one or more processors to perform the steps of:
  obtaining, in an extended reality (XR) environment, a virtual model corresponding to a hand of a user in a physical environment and used to represent a location of a virtual representation of the hand of the user within the XR environment;
  identifying a virtual trackpad in the XR environment, wherein:
    a surface of the virtual trackpad is configured to control a focus selector mapped to a surface of a distant virtual object in the XR environment,
    the virtual trackpad is presented at a first location distinct from the location of the virtual representation of the hand of the user, and
    the virtual trackpad is displayed in the XR environment generated within an NED system;
  in accordance with a determination that the virtual representation of the hand of the user is within a proximity threshold to the first location of the virtual trackpad, activating the virtual trackpad;
  responsive to a determination that the virtual trackpad is activated, tracking a movement of the virtual representation of the hand and at least one finger associated with the virtual representation of the hand of the user, such that a sensitivity using to track the at least one finger is distinct from a different sensitivity used to track the virtual representation of the hand of the user;

responsive to a determination that the virtual trackpad is activated, tracking a movement of the virtual representation of the hand and at least one finger associated with the virtual representation of the hand of the user using the sensitivity;

determining an action to be performed in relation to the distant virtual object that corresponds to the movement; and performing the action.

11. The one or more non-transitory computer-readable media of claim 10, wherein the surface of the virtual trackpad is mapped in its entirety to the surface of the distant virtual object, and wherein each area of the virtual trackpad correlates to a specific location on the distant virtual object.

12. The one or more non-transitory computer-readable media of claim 10, wherein the surface of the virtual trackpad is mapped to the surface of the distant virtual object by utilizing a gain function, and wherein the gain function maps a relative movement of a finger associated with the virtual model to a corresponding action associated with the distant virtual object.

13. The one or more non-transitory computer-readable media of claim 12, wherein the relative movement is a movement of a thumb associated with the virtual model and the corresponding action is a movement of a cursor on the surface of the distant virtual object.

14. The one or more non-transitory computer-readable media of claim 10, wherein the movement is a movement of an index finger associated with the virtual model and the action is a selection of an item on the surface of the distant virtual object.

15. The one or more non-transitory computer-readable media of claim 10, wherein the movement is a movement of an index finger associated with the virtual model and the action is a movement of a cursor on the surface of the distant virtual object.

16. The one or more non-transitory computer-readable media of claim 10, wherein determining if the virtual trackpad is activated comprises determining if a thumb associated with the virtual model is within the proximity threshold of the virtual trackpad.

17. A wearable device, comprising:
one or more memories that store instructions, and
one or more processors that are coupled to the one or more memories and, when executing the instructions, are configured to:

obtain, in an extended reality (XR) environment, a virtual model corresponding to a hand of a user in a physical environment and used to represent a location of a virtual representation of the hand of the user within the XR environment;

identify a virtual trackpad in the XR environment, wherein:
  a surface of the virtual trackpad is configured to control a focus selector mapped to a surface of a distant virtual object in the XR environment,
  the virtual trackpad is presented at a first location distinct from the location of the virtual representation of the hand of the user, and
  the virtual trackpad is displayed in the XR environment generated within an NED system;

in accordance with a determination that the virtual representation of the hand of the user is within a proximity threshold to the first location of the virtual trackpad, activate the virtual trackpad;

responsive to a determination that the virtual trackpad is activated, track a movement of the virtual representation of the hand and at least one finger associated with the virtual representation of the hand of the user, such that a sensitivity using to track the at least one finger is distinct from a different sensitivity used to track the virtual representation of the hand of the user;

responsive to a determination that the virtual trackpad is activated, track a movement of the virtual representation of the hand and at least one finger associated with the virtual representation of the hand of the user using the sensitivity;

determine an action to be performed in relation to the distant virtual object that corresponds to the movement; and perform the action.

18. The wearable device of claim 17, wherein sensitivity settings for tracking the movement of the virtual representation of the hand are user-configurable.

* * * * *